United States Patent
Kim

(10) Patent No.: US 11,032,467 B2
(45) Date of Patent: Jun. 8, 2021

(54) MOBILE TERMINAL AND CONTROL METHOD THEREOF FOR OBTAINING IMAGE IN RESPONSE TO THE SIGNAL

(71) Applicant: LG ELECTRONICS INC., Seoul (KR)

(72) Inventor: Jungki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/478,066

(22) PCT Filed: Feb. 20, 2017

(86) PCT No.: PCT/KR2017/001850
§ 371 (c)(1),
(2) Date: Jul. 15, 2019

(87) PCT Pub. No.: WO2018/131747
PCT Pub. Date: Jul. 19, 2018

(65) Prior Publication Data
US 2019/0364195 A1    Nov. 28, 2019

(30) Foreign Application Priority Data

Jan. 16, 2017 (KR) .......... 10-2017-0006942

(51) Int. Cl.
*H04N 5/232* (2006.01)
*H04M 1/724* (2021.01)
(Continued)

(52) U.S. Cl.
CPC ........ *H04N 5/23218* (2018.08); *H04M 1/724* (2021.01); *H04N 5/2258* (2013.01);
(Continued)

(58) Field of Classification Search
CPC ......... H04N 5/23218; H04N 5/232935; H04N 5/2258; H04N 5/23216; H04M 1/72519;
(Continued)

(56) References Cited

U.S. PATENT DOCUMENTS 8,593,555 B1 * 11/2013 Chun ................. H04N 5/23293
                                                        348/333.01
9,800,798 B2 * 10/2017 Ravirala ................ H04N 5/247
(Continued)

FOREIGN PATENT DOCUMENTS

CN      101931691 A    12/2010
CN      103813108 A     5/2014
(Continued)

*Primary Examiner* — Albert H Cutler
(74) *Attorney, Agent, or Firm* — Birch, Stewart, Kolasch & Birch, LLP

(57) ABSTRACT

The present invention relates to a mobile terminal having a plurality of cameras and a video image capturing control method thereof. The mobile terminal according to an embodiment of the present invention comprises: a memory; a display unit; a first camera for acquiring a first image corresponding to a preview image being displayed on the display unit; a second camera for detecting an object in the preview image by the first camera, and acquiring a second image for the detected object; and a control unit for controlling the first camera to respond to a signal for acquiring the first image, and the second camera to acquire the second image together.

12 Claims, 13 Drawing Sheets

(51) Int. Cl.
*H04N 5/225* (2006.01)
*H04M 1/72403* (2021.01)

(52) U.S. Cl.
CPC ... *H04N 5/23216* (2013.01); *H04N 5/232935* (2018.08); *H04M 2250/12* (2013.01)

(58) Field of Classification Search
CPC .... H04M 2250/12; H04M 1/02; H04M 1/725; H04M 1/724; H04M 1/72403; H04M 2250/52; G06F 2200/1614
USPC .......................................... 348/231.99–231.6
See application file for complete search history.

(56) References Cited

U.S. PATENT DOCUMENTS

| | | | | |
|---|---|---|---|---|
| 2005/0128323 | A1* | 6/2005 | Choi | G03B 29/00 |
| | | | | 348/239 |
| 2007/0052819 | A1* | 3/2007 | Nakao | H04N 1/00204 |
| | | | | 348/231.1 |
| 2011/0064327 | A1* | 3/2011 | Dagher | G06T 5/004 |
| | | | | 382/263 |
| 2011/0242369 | A1* | 10/2011 | Misawa | H04N 5/23293 |
| | | | | 348/240.2 |
| 2012/0268641 | A1* | 10/2012 | Kazama | H04N 5/23293 |
| | | | | 348/333.11 |
| 2013/0076867 | A1* | 3/2013 | Sakurai | G03B 19/07 |
| | | | | 348/47 |
| 2016/0007008 | A1 | 1/2016 | Molgaard et al. | |
| 2016/0173757 | A1* | 6/2016 | Choi | H04N 5/23212 |
| | | | | 348/262 |
| 2016/0381289 | A1 | 12/2016 | Kim et al. | |
| 2019/0121216 | A1* | 4/2019 | Shabtay | H04N 5/2254 |

FOREIGN PATENT DOCUMENTS

| | | |
|---|---|---|
| CN | 104333701 A | 2/2015 |
| CN | 105245771 A | 1/2016 |
| CN | 106101553 A | 11/2016 |
| CN | 104284085 B | 11/2017 |
| CN | 104243800 B | 10/2019 |
| JP | 2006-33224 A | 2/2006 |
| KR | 10-2010-0037392 A | 4/2010 |
| KR | 10-2014-0062801 A | 5/2014 |
| KR | 10-2017-0000311 A | 1/2017 |
| TW | 200943936 A1 | 10/2009 |

\* cited by examiner

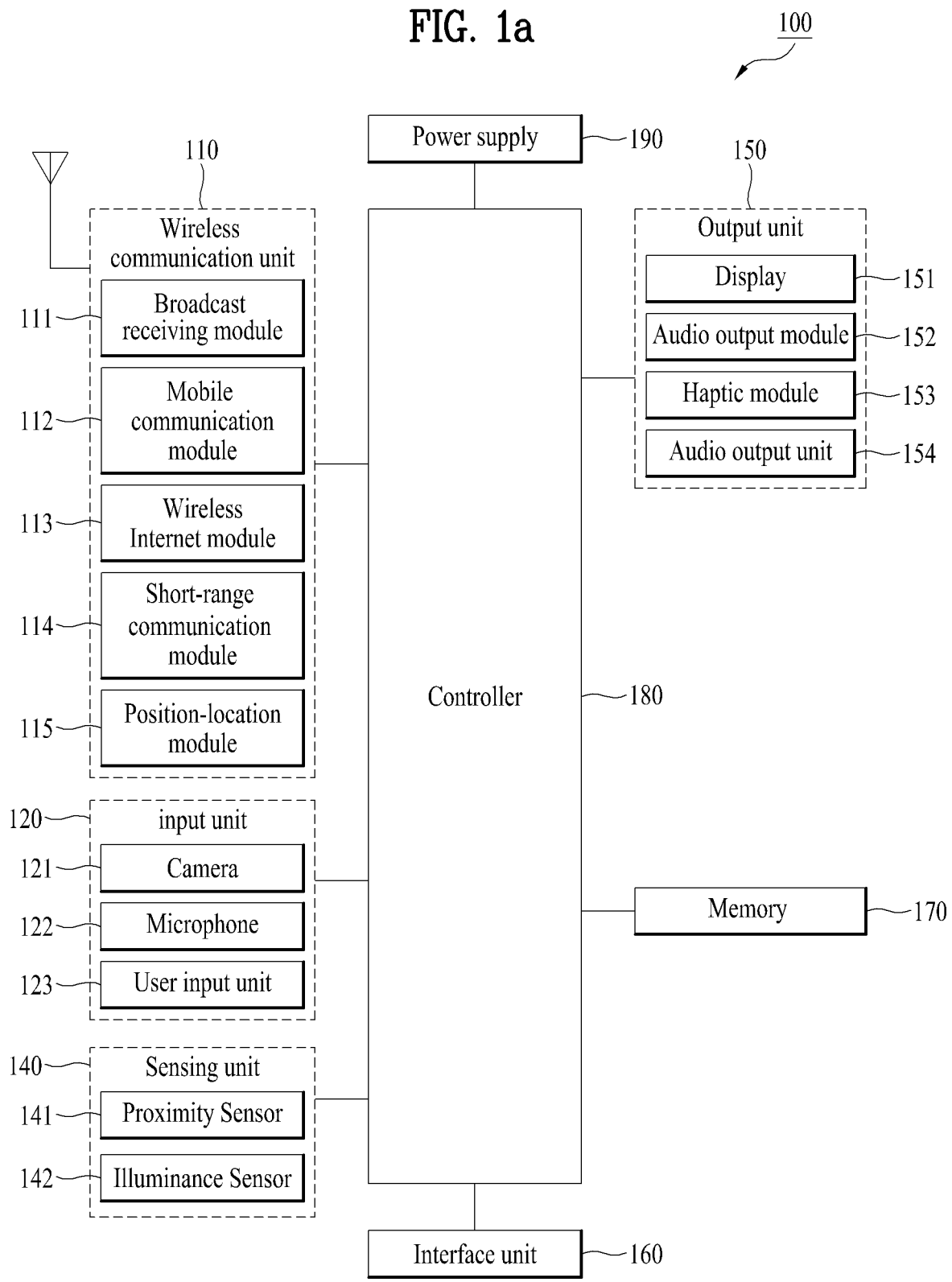

200  FIG. 2
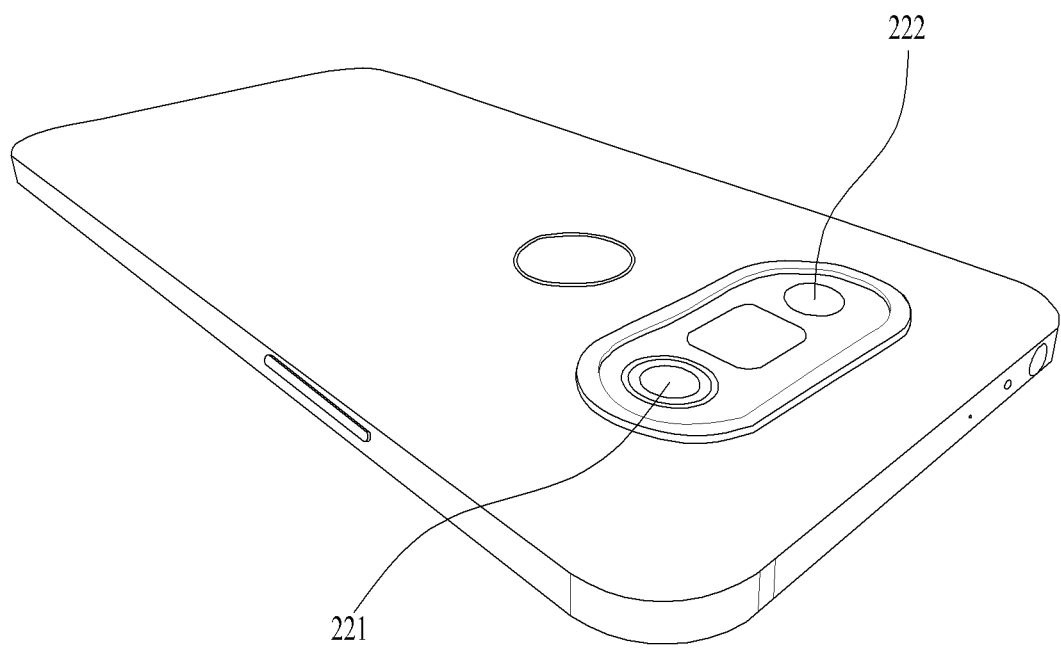
FIG. 3
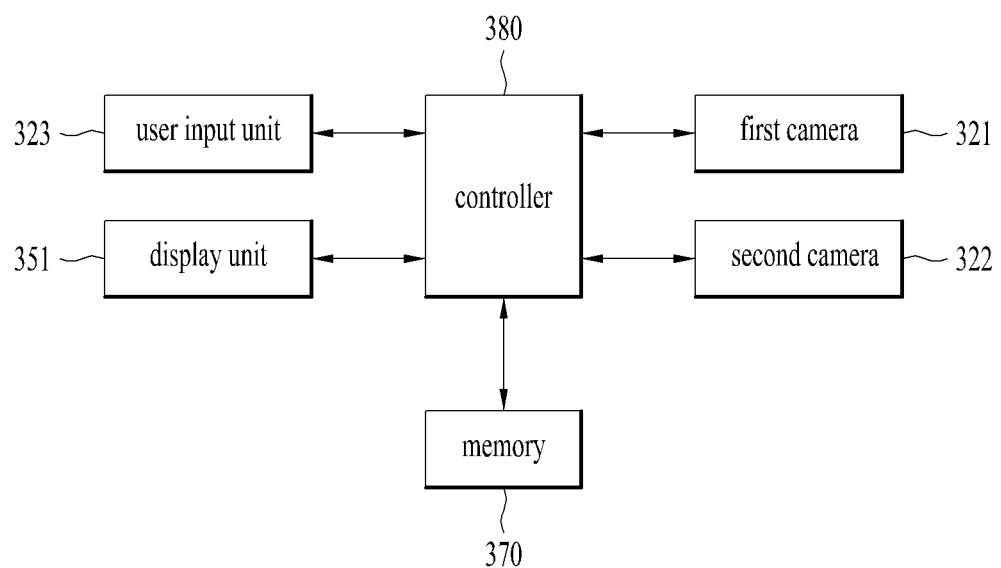

MOBILE TERMINAL AND CONTROL METHOD THEREOF FOR OBTAINING IMAGE IN RESPONSE TO THE SIGNAL

CROSS REFERENCE TO RELATED APPLICATIONS

This application is the National Phase of PCT International Application No. PCT/KR2017/001850, filed on Feb. 20, 2017, which claims priority under 35 U.S.C. 119(a) to Patent Application No. 10-2017-0006942, filed in the Republic of Korea on Jan. 16, 2017, all of which are hereby expressly incorporated by reference into the present application.

TECHNICAL FIELD

The present invention relates to a mobile terminal having a plurality of cameras and method of controlling a video shooting therein.

BACKGROUND ART

Terminals may be generally classified as mobile/portable terminals or stationary terminals according to their mobility.

Mobile terminals have become increasingly more functional. Such terminals perform various functions such as capturing images and video, playing music or video files, game playing, receiving broadcasts and the like by being configured as multimedia players.

To support and expand functions of a terminal, it is able to consider improving structural parts and/or software parts of the terminal.

Generally, a mobile terminal having a plurality of cameras obtains an image by controlling each of the cameras.

However, according to the related art, there is a problem that an image including both an object and a background and an image including an object only cannot be obtained simultaneously.

DISCLOSURE OF THE INVENTION

Technical Task

One technical task of the present invention is to simultaneously obtain an image including both an object and a background and an image including an object only by controlling a plurality of cameras provided to a mobile terminal.

Another technical task of the present invention is to detect a housing orientation of a mobile terminal and display a different image according to the detected housing orientation in displaying a plurality of the obtained images.

Technical Solutions

In one technical aspect of the present invention, provided herein is a mobile terminal, including a memory, a display unit, a first camera configured to obtain a first image corresponding to a preview image currently displayed on the display unit, a second camera configured to detect an object from the preview image by the first camera and obtain a second image for the detected object, and a controller controlling the second camera to obtain the second image together in response to a signal for the first camera to obtain the first image.

In another technical aspect of the present invention, provided herein is a method of controlling a mobile terminal, the method including obtaining a first image corresponding to a preview image currently displayed on a display unit through a first camera and detecting an object from the preview image obtained by the first camera by controlling the second camera in response to a signal for the first camera to obtain the first image and obtaining a second image for the detected object together.

Advantageous Effects

According to the present invention, the following effects are provided.

As a mobile terminal according to the present invention simultaneously obtains an image of a specific object included in a preview image using a separate camera, the image of the specific object can be obtained without degradation of image quality.

Moreover, as the present invention detects a housing orientation of a mobile terminal and provides an image obtained by a camera having a view angle optimized for the housing orientation of the mobile terminal, a user can check a desired image easily and conveniently by manipulating the housing orientation of the mobile terminal.

DESCRIPTION OF DRAWINGS

FIG. 1A is a block diagram to describe a mobile terminal related to the present invention.

FIG. 2 is a perspective diagram showing a rear side of a mobile terminal having a plurality of cameras related to the present invention.

FIG. 3 is a block diagram showing configuration of a mobile terminal related to the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and digital signage.

Figure 1B:
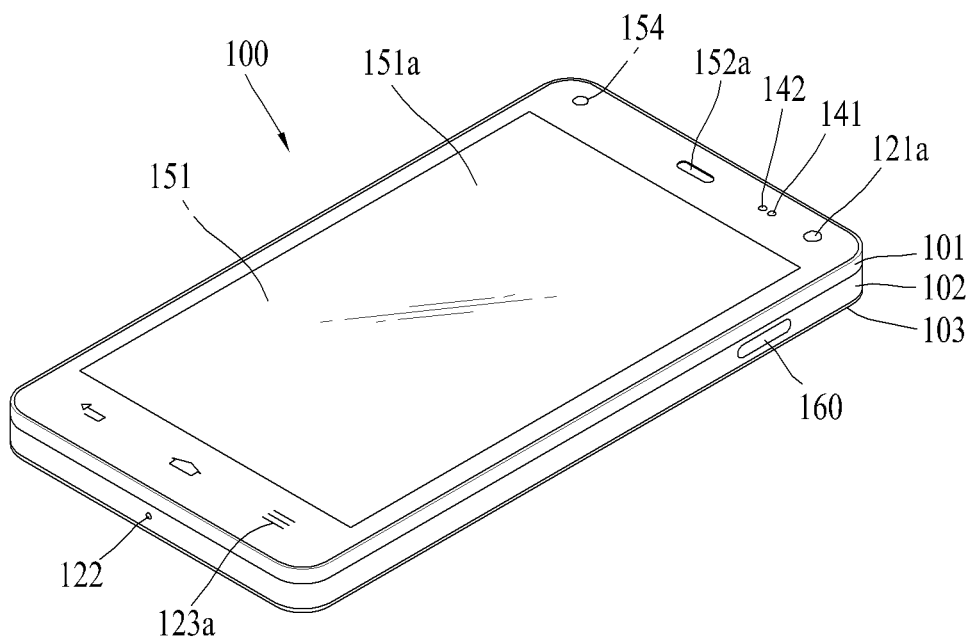
FIG. 1B and FIG. 1C are conceptual diagrams for one example of a mobile terminal related to the present invention, viewed in different directions.
Figure 1C:
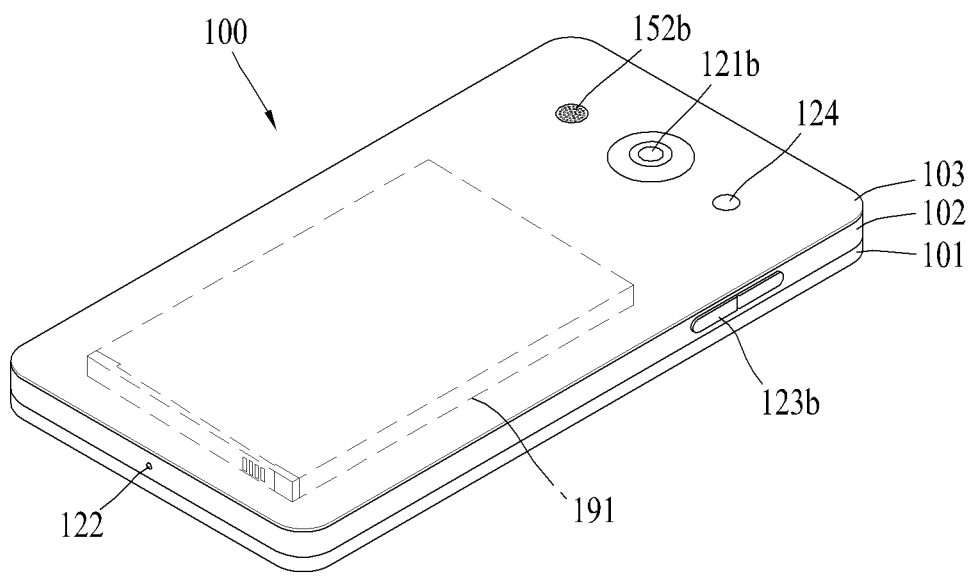

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

The mobile terminal 100 includes a case (for example, a frame, a housing, a cover and the like) that forms an exterior. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the 1st audio output unit 152a, the 2nd audio output unit 152b, the proximity sensor 141, the illumination sensor 142, the light output unit 154, the 1st camera 121a, the 2nd camera 121b, the 1st manipulating unit 123a, the 2nd manipulating unit 123b, the microphone 122, the interface unit 160, and the like.

Hereinafter, as illustrated in FIGS. 1B and 1C, the mobile terminal 100 having the display unit 151, the 1st audio output unit 152a, the proximity sensor, the illumination sensor 142, the light output unit 154, the 1st camera 121a and the 1st manipulating unit 123a on the front side and the 2nd manipulating unit 123b, the microphone 122 and the interface unit 160 on the side surface and the 2nd audio output unit 152b and the 2nd camera 121b on the rear side will be described as an example.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver that transmits a call sound to a user's ear. The second audio output module 152b may be implemented in the form of a loud speaker to output alarm sounds, multimedia audio, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

FIG. 2 is a perspective diagram showing a rear side of a mobile terminal having a plurality of cameras related to the present invention.

A mobile terminal 200 according to the present invention may include a first camera 221 and a second camera 222 provided to a rear side of the mobile terminal 200. The first and second cameras 221 and 222 may be provided by being spaced apart from each other in a preset distance. Here, the two cameras 221 and 222 are provided by being spaced apart from each other so as to obtain different images of the same subject using both of the cameras simultaneously.

The two cameras 221 and 222 may have different pixel numbers and view angles, respectively. For example, the first camera 221 may have a view angle of a wide angle and the second camera 222 may have a normal view angle, and vice versa. The following description shall be made on the assumption that the first camera 221 and the second camera 222 include a camera having a view angle of a wide angle and a camera having a normal view angle, respectively.

FIG. 3 is a block diagram showing configuration of a mobile terminal related to the present invention.

As described with reference to FIG. 2, first and second cameras 321 and 322 may have different pixel numbers and view angles, respectively. Although FIG. 2 shows that the first and second cameras are provided to the rear side of the mobile terminal, the first and second cameras may be provided to a front side of the mobile terminal instead.

A user input unit 323 receives a signal for obtaining a first image and a second image. A signal for obtaining an image includes a signal generated by a touch input to a physical button (not shown) provided to a mobile terminal 300 or a shot button 630 shown in FIG. 6 described later. If a signal for obtaining an image is a touch input to the shot button 630 displayed on a display unit, the user input unit 323 and the display unit 351 may operate by being configured as a single module. Meanwhile, obtaining an image may be understood as capturing an image by a prescribed camera.

The display unit 351 displays a preview image through the first or second camera. The display unit 351 displays a prescribed shot button 630 to obtain an image together with the preview image.

A memory 370 stores images obtained by the first and second cameras 321 and 322.

A controller 380 controls the first camera 321, the second camera 322, the user input unit 323, the display unit 351 and the memory 370 by being coupled thereto, respectively. Meanwhile, the controller 380 may correspond to the former controller 180 shown in FIG. 1A.

Figure 4:
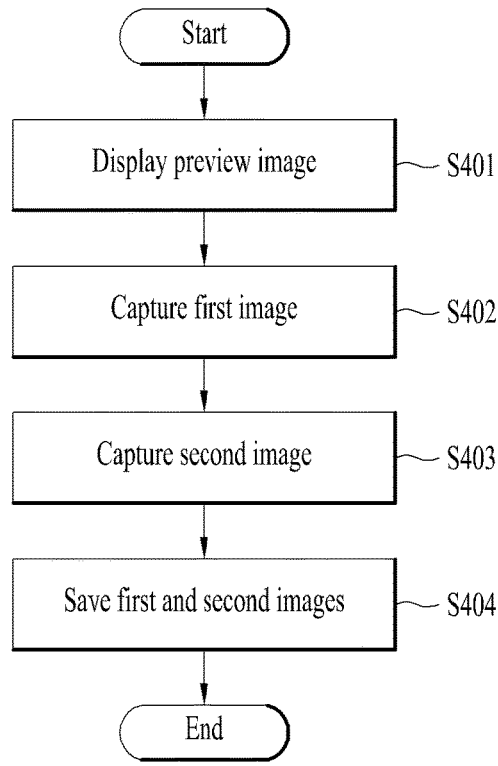
FIG. 4 is a flowchart describing an image capturing method of a mobile terminal according to one embodiment of the present invention.

FIG. 4 is a flowchart describing an image capturing method of a mobile terminal according to one embodiment of the present invention. The following description shall be made on the assumption that a camera scene mode of the mobile terminal is entered.

The display unit 351 displays a preview image that is an image currently captured by at least one camera [S401]. The at least one camera may include at least one of a first camera and a second camera according to the present invention.

Subsequently, the first camera 321 obtains a first image corresponding to the preview image currently displayed on the display unit 351 [S402]. Here, obtaining the first image may be interpreted as the same meaning of capturing the first image. A signal for obtaining the first image is received through the user input unit 323.

Subsequently, the second camera 322 obtains a second image [S403]. Here, obtaining the second image may be interpreted as the same meaning of capturing the second image. The controller 380 controls the second camera to detect an object from the preview image at the timing point that the first camera obtains the first image and obtain the second image centering on the detected object.

According to another embodiment of the present invention, the mobile terminal controls the first camera 321 and the second camera 322 to obtain the first image and the second image simultaneously. Namely, the controller 380 of the mobile terminal controls the second camera to obtain the second image together in response to a signal that first camera obtains the first image.

Here, obtaining the first image and the second image simultaneously should be understood as obtaining images at the physically same time or the time regarded as the substantially same.

Thus, as the mobile terminal according to another embodiment of the present invention detects a specific object contained in a preview image and obtains a second image centering on the detected specific object through the second camera simultaneously, thereby obtaining an image for the specific object without degradation of image quality.

Subsequently, the controller 380 of the mobile terminal 300 saves the first and second images to the memory 370 [S404]. The controller 380 may save the first and second images to the memory 370 in a manner of distinguishing them as separate images, respectively.

Meanwhile, the mobile terminal according to another embodiment of the present invention may be designed to create a third image by image-processing the first and second images and save the created third image to the memory 370.

For example, the controller 380 can create the third image in a manner of setting the first image as a basic image and then coding or encoding metadata of the second image to a header part of a raw image format of the first image.

The raw image format of the first image can be partitioned into a header part and a body part, and metadata of a different image can be encoded to the header part. The metadata is the data including camera data such as view angle, pixels, aperture number, shutter speed and the like and image data such as shooting time, exposure, presence or non-presence of flash use, resolution, image size and the like.

As the third image includes all the data corresponding to the first image and the second image, the controller 380 can control one of the first and second images to be selectively displayed on the display unit according to a housing orientation of the mobile terminal.

Figure 5:
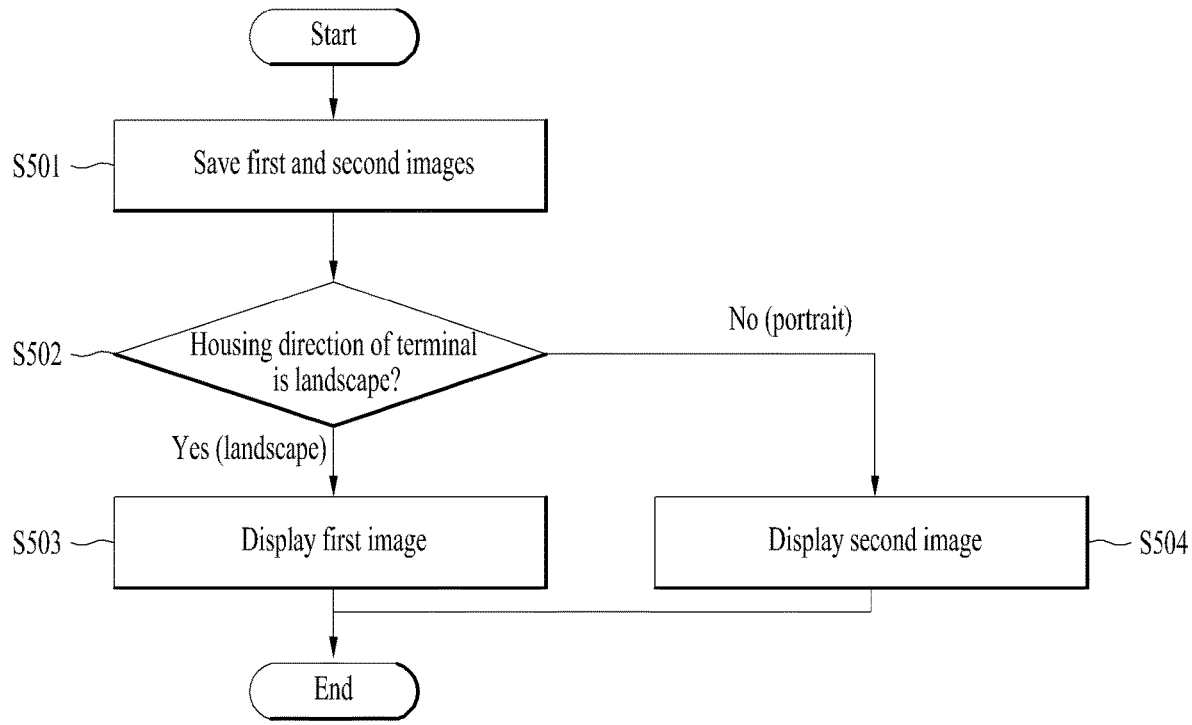
FIG. 5 is a flowchart describing a method of displaying an image captured by a mobile terminal according to one embodiment of the present invention.

FIG. 5 is a flowchart describing a method of displaying an image obtained by a mobile terminal according to one embodiment of the present invention.

In the description with reference to FIG. 5, according to a housing orientation of a mobile terminal, the saved first or second image is selectively displayed. The following description shall be made on the assumption that a mobile terminal menu for checking the saved first or second image is entered.

A step S501 in FIG. 5 corresponds to the step S404 in FIG. 4.

Subsequently, the controller 380 of the mobile terminal detects a housing orientation of the mobile terminal [S502]. The controller 380 can detect the housing orientation of the mobile terminal by controlling the aforementioned sensing unit 140 shown in FIG. 1(*a*). The sensing unit 140 may include an acceleration sensor or a gyroscope sensor.

In response to the mobile terminal's housing orientation sensed through the sensing unit, the controller 380 controls a first image or a second image to be displayed on the display unit 351 selectively.

Namely, if the housing orientation is detected as a first direction through the sensing unit 140, the controller 380 controls the first image to be displayed on the display unit 351. Or, if detecting the housing orientation as a second direction, the controller 380 controls the second image to be displayed on the display unit 351. In doing so, the controller 380 can access the memory 370 so as to display the first or second image on the display unit 351. Moreover, the first direction may correspond to a direction in which the housing orientation of the mobile terminal is horizontal (landscape) and the second direction may correspond to a direction in which the housing orientation of the mobile terminal is vertical (portrait).

According to the related art, if a housing orientation of a mobile terminal is changed, an image is displayed in a manner that a size of the image is changed to correspond to a screen ratio only but a different image is not displayed selectively.

On the contrary, a mobile terminal according to one embodiment of the present invention is designed to selectively display a different image in response to a housing orientation.

Accordingly, if a housing orientation is landscape, a user is able to check an image (e.g., a first image) containing both an object (e.g., a character) and a background. If the housing orientation is portrait, the user is able to check an image (e.g., a second image) obtained centering on the object (e.g., the character).

Figure 6:
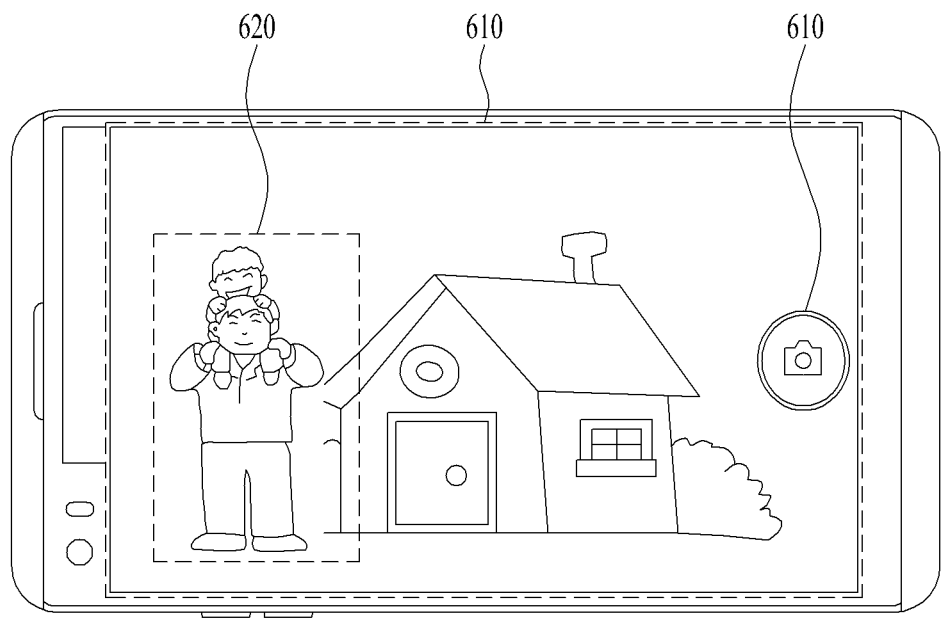
FIG. 6 is a diagram showing a preview image displayed mobile terminal according to one embodiment of the present invention.

FIG. 6 is a diagram showing a preview image displayed mobile terminal according to one embodiment of the present invention. Particularly, FIG. 6 is a diagram describing the step S401 shown in FIG. 4.

If a camera scene mode of the mobile terminal is entered, a preview image 610 by the first camera is displayed on the display unit. FIG. 6 shows that at least one object (character) and a background are included in the preview image 610.

While the preview image 610 by the first camera is displayed, the second camera detects a specific object 620 from the at least one or more objects included in the preview image 610 under the control of the controller 380. As shown in FIG. 6, the controller may display a prescribed indicator, which indicates that the specific object 620 is detected, on the preview image 610 as well. If a plurality of objects are detected, the indicator may be designed to be displayed for each of the detected objects.

In case of receiving a touch input to a shot button 630 on the display unit, the mobile terminal obtains the preview image by the first camera as a first image and also obtains an image including the specific object 620 detected by the second camera as a second image.

In order for the second camera according to one embodiment of the present invention to detect the specific object 620, an object detection technology may apply. The object detection technology is the technology related to image processing and detects a meaningful object of a specific class (e.g., character, building, car, etc.) from a digital image. Particularly, object detection may include a face detection technology.

According to another embodiment of the present invention, if a plurality of objects are detected from the preview image 620 by the second camera, a user's touch input to a region corresponding to a specific object may be received to select the specific object. Moreover, if the user's touch input to select the specific object is not received before a signal for obtaining an image is received, it may be designed to obtain a second image for each of a plurality of the objects.

Meanwhile, although the preview image 610 through the first camera is shown in FIG. 6, displaying a preview image through the second camera belongs to the scope of the appended claims and their equivalents.

Figure 7:
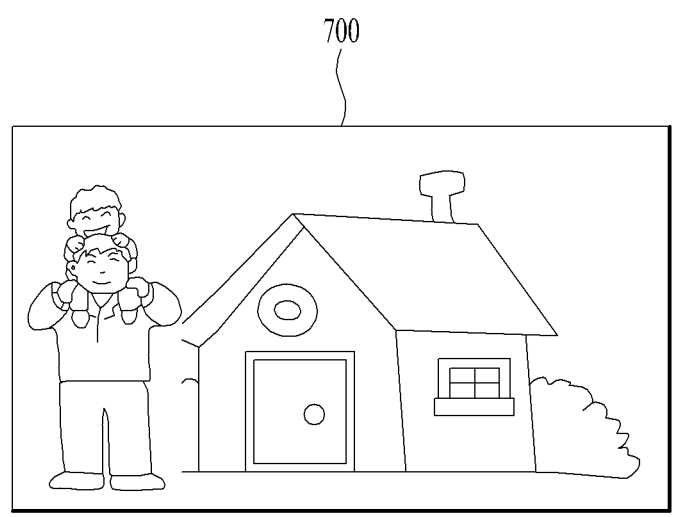
FIG. 7 and FIG. 8 are diagrams showing a first image and a second image captured by a mobile terminal according to one embodiment of the present invention, respectively.
Figure 8:

FIG. 7 is a diagram showing a first image obtained by a first camera, and FIG. 8 is a diagram showing a second image obtained by a second camera.

According to the aforementioned step S402 show in FIG. 4, a first image 700 shown in FIG. 7 is obtained. The first image 700 is obtained by the first camera having a view angle relatively wider than that of the second camera and corresponds to the aforementioned preview image 610 shown in FIG. 6.

According to the aforementioned step S403 show in FIG. 4, a second image 800 shown in FIG. 8 is obtained. The second image 800 is obtained by the second camera having a view angle relatively narrower than that of the first camera and corresponds to the aforementioned image captured centering on the specific object 620 shown in FIG. 6.

Meanwhile, as shown in FIG. 8, the controller 380 can control the second camera to obtain the second image 800 in a manner that the detected specific object is located at the center of the view angle of the second camera, i.e., in focus.

Figure 9:
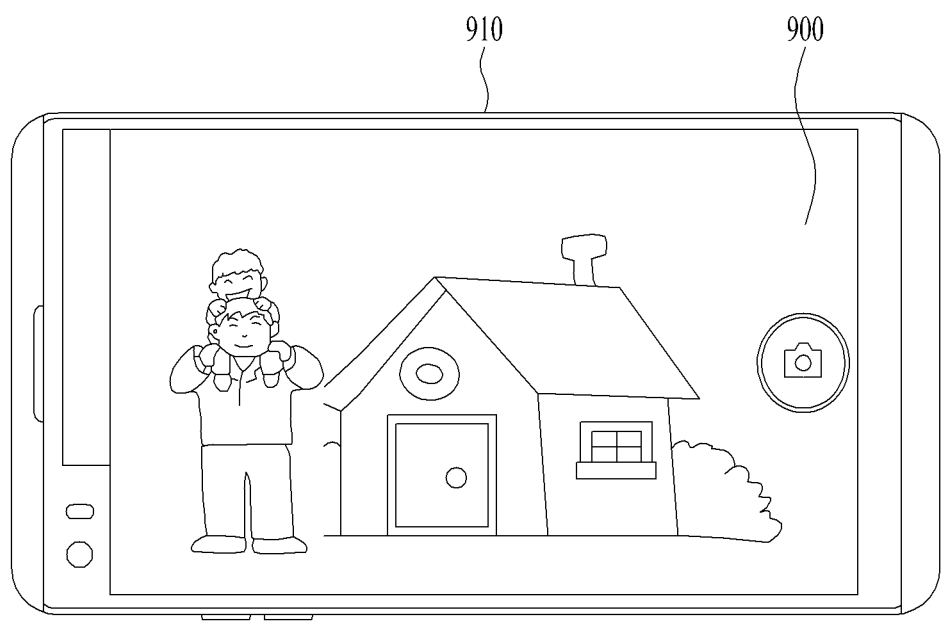
FIG. 9 and FIG. 10 are diagrams showing a first image and a second image captured and displayed on a mobile terminal according to one embodiment of the present invention, respectively.
Figure 10:

FIG. 9 is a diagram showing a first image 900 displayed on a display unit of a mobile terminal and FIG. 10 is a diagram showing a second image 1000 displayed on a display unit of a mobile terminal.

Referring to FIG. 9, if detecting that a housing orientation 910 is a first direction through the sensing unit 140, the controller 380 controls the display unit to display a first image 900 including both an object (character) and a background. The first direction may correspond to a direction in which a housing orientation of the mobile terminal is landscape. If necessary, the controller 380 may access the memory 370.

Referring to FIG. 10, if detecting that a housing orientation 910 is a second direction through the sensing unit 140, the controller 380 controls the display unit 351 to display a second image 1000 obtained centering on a specific object (character). The second direction may correspond to a direction in which a housing orientation of the mobile terminal is portrait. If necessary, the controller 380 may access the memory 370.

The present invention detects a housing orientation of a mobile terminal and selectively provides one of images obtained by a plurality of cameras according to the detected housing orientation of the mobile terminal, whereby a user can check a desired image easily and conveniently by manipulating the housing orientation of the mobile terminal.

In some implementations, according to another embodiment of the present invention, on a gallery menu in which a plurality of images stored in a mobile terminal are arranged by being reduced in grid form, a first or second image can be designed to be selectively displayed according to a terminal housing orientation. Moreover, adjusting the number of grids filling one row or column according to a terminal housing orientation comes within the scope of the appended claims and their equivalents.

Figure 11:
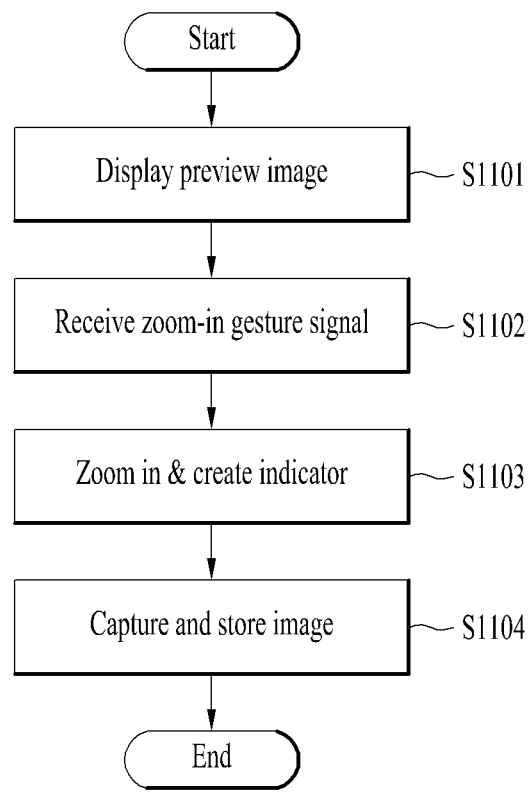
FIG. 11 is a flowchart describing an image capturing method of a mobile terminal according to one embodiment of the present invention in case of receiving a zoom-in signal.

FIG. 11 is a flowchart describing an image capturing method of a mobile terminal according to one embodiment of the present invention in case of receiving a zoom-in signal.

First of all, the display unit 351 displays a preview image that is a video that is currently captured by at least one of the first and second cameras [S1101]. For clarity, the following description shall be made on the assumption that the preview image by the first camera is being displayed. A step S1101 shown in FIG. 11 corresponds to the step S401 shown in FIG. 4.

Subsequently, the user input unit 323 of the mobile terminal receives a zoom-in signal for a region in which a specific object is included [S1102]. The zoom-in signal corresponds to a signal generated through a touch input to a prescribed region of the display unit 351 or a physical button (not shown) provided to the mobile terminal.

For example, the zoom-in signal may include a consecutive touch input within a preset time interval, a touch input (e.g., a spread touch input) to the display unit, a user voice input through the microphone 122, or an input according to a motion recognition through a camera.

Subsequently, the controller 380 creates a prescribed indicator and controls the display unit 351 to display the created indicator and a zoom-in preview image together [S1103]. The prescribed indicator indicates a rate of the object included in the zoom-in preview image in a whole region of an object detected by the second camera. Regarding this, detailed description shall be made with reference to FIG. 14.

Subsequently, if a signal for obtaining an image is received through the user input unit 323, the controller obtains a plurality of images by controlling the first and second cameras and then saves them to the memory 370. Regarding this, detailed description shall be made with reference to FIGS. 15 to 17.

Figure 12:
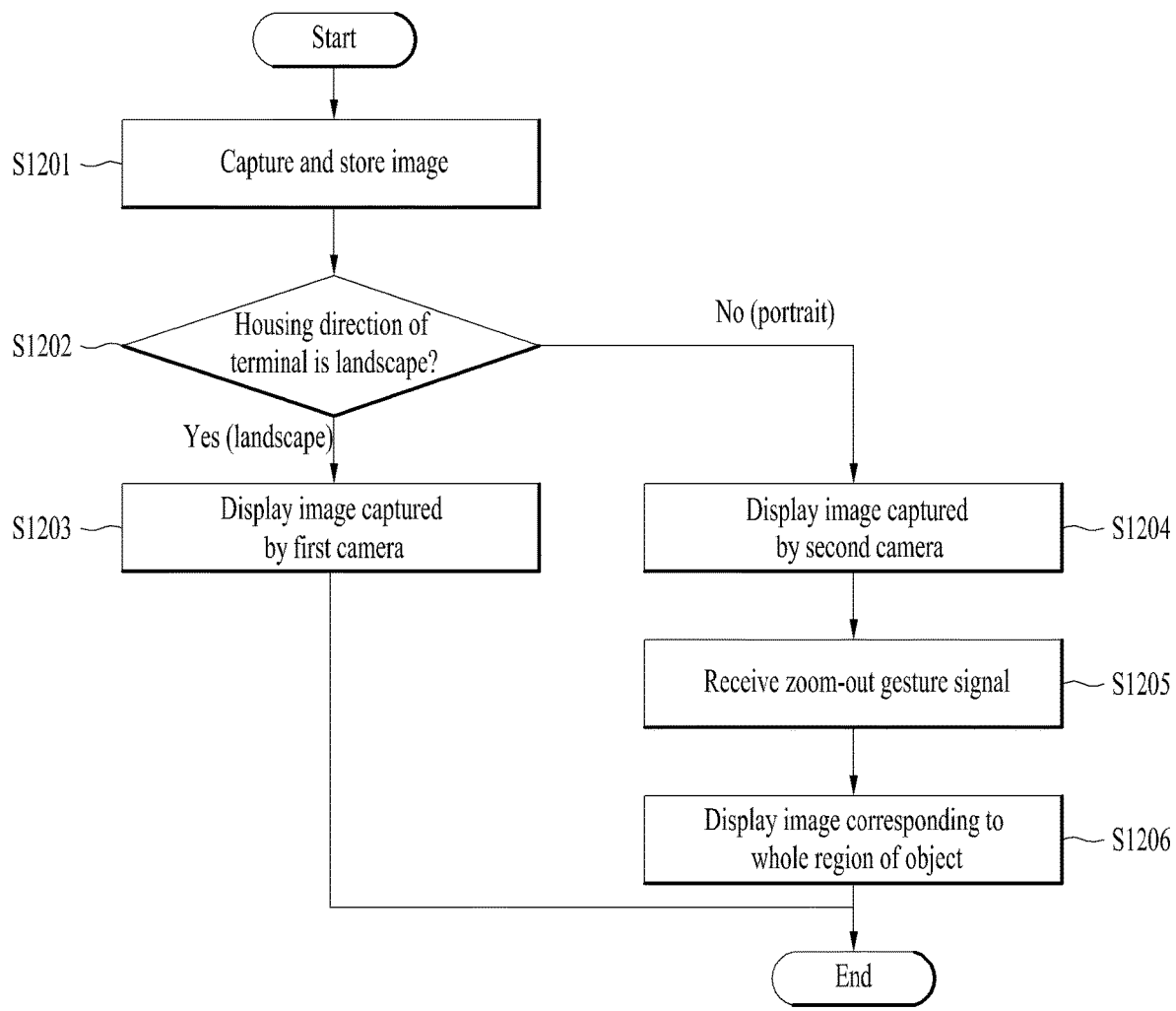
FIG. 12 is a flowchart describing a method of displaying an image captured by a mobile terminal according to one embodiment of the present invention.

FIG. 12 is a flowchart describing a method of displaying an image captured by a mobile terminal according to another embodiment of the present invention.

Assuming that a menu of the mobile terminal for checking a stored image is entered in FIG. 12, displaying a plurality of images stored in the memory 370 according to housing orientations of the mobile terminal selectively shall be described as follows.

A step S1201 in FIG. 12 corresponds to the step S1104 in FIG. 11.

Subsequently, the controller 380 of the mobile terminal detects a housing orientation of the mobile terminal [S1202]. The controller 380 can detect the housing orientation of the mobile terminal by controlling the aforementioned sensing unit 140 shown in FIG. 1(a). The sensing unit 140 may include an acceleration sensor or a gyroscope sensor.

If the housing orientation is detected as a first direction through the sensing unit 140, the controller 380 controls an image (corresponding to a zoom-in preview image), which is obtained by the first camera, to be displayed [S1203]. The first direction may correspond to a direction in which the housing orientation of the mobile terminal is landscape. If necessary, the controller can access the memory 370.

On the other hand, if the housing orientation is detected as a second direction, the controller 380 controls an image, which corresponds to a partial region of an object included in the zoom-in preview image, to be displayed [S1204]. The second direction may correspond to a direction in which the housing orientation of the mobile terminal is portrait. If necessary, the controller can access the memory 370.

Subsequently, the controller 380 receives a zoom-out signal through the user input unit 323 [S1205]. In response to the zoom-out signal, the controller controls an image, which corresponds to a whole region of an object detected by the second camera, to be displayed [S1206].

The steps S1203 to S1206 shall be described in detail with reference to FIG. 18 and FIG. 19 later.

Figure 13:
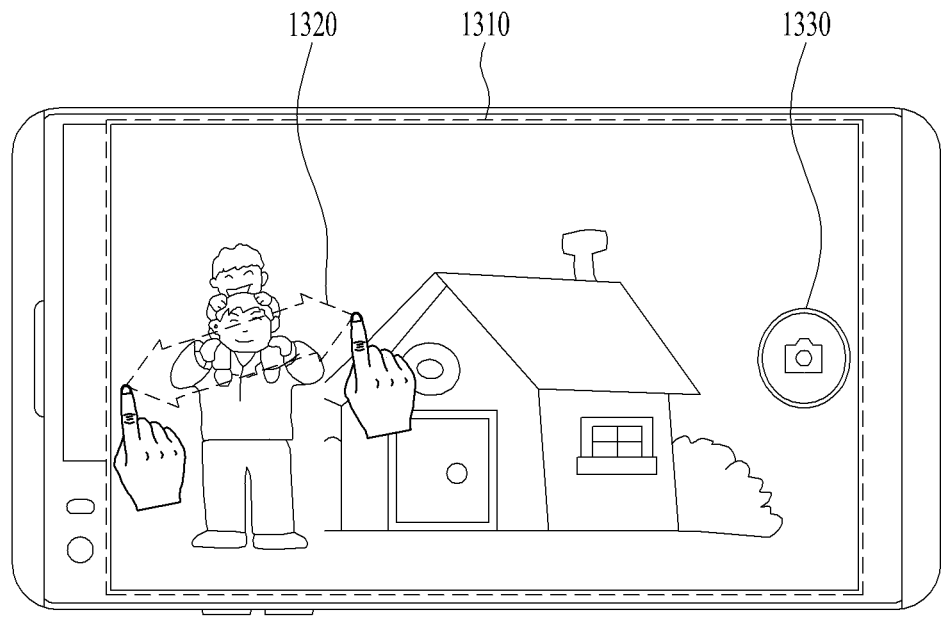
FIG. 13 is a diagram showing a preview image displayed mobile terminal according to one embodiment of the present invention.

FIG. 13 is a diagram showing a preview image displayed mobile terminal according to another embodiment of the present invention.

Basically, a preview image 1310 shown in FIG. 13 is the same as the preview image 610 by the first camera in FIG. 6. Yet, in the embodiment of FIG. 13, a step of receiving a zoom-in signal for a region 1320 in which a specific object of the preview image 1310 is included is added.

The user input unit 323 of the mobile terminal receives a zoom-in signal for a region 1320 in which a specific object is included. The zoom-in signal corresponds to a signal generated through a touch input to a prescribed region of the display unit 351 or a signal generated through a physical button (not shown) provided to the mobile terminal.

The touch input to the prescribed region includes a touch input substantially regarded as a zoom-in signal such as a consecutive touch input within a preset time interval, a spread touch input or the like.

Figure 14:
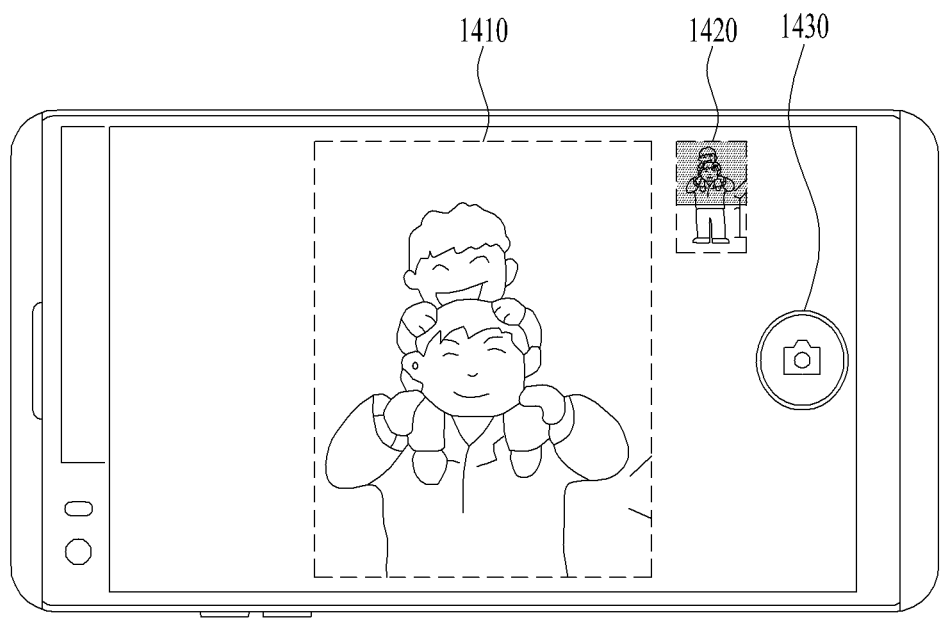
FIG. 14 is a diagram showing a preview image displayed mobile terminal according to one embodiment of the present invention in case of receiving a zoom-in signal.

FIG. 14 is a diagram showing a preview image displayed mobile terminal according to another embodiment of the present invention in case of receiving a zoom-in signal.

If the controller receives a zoom-in signal for the region 1320 including the specific object of the preview image 1310 according to FIG. 13, as shown in FIG. 14, the controller controls a prescribed indicator 1420 to be displayed on a prescribed region of the display unit together with a zoom-in preview image.

The prescribed indicator 1420 indicates a rate of an object included in the zoom-in image among a whole region of an object detected by the second camera.

Namely, the indicator 1420 indicates a rate occupied by a prescribed region 1410 of the object included in the zoom-in preview image among the whole region of the object detected by the second camera. Moreover, as shown in FIG. 14, the prescribed region of the object displayed within the indicator 1420 can be controlled in a manner of being shaded.

Figure 15:
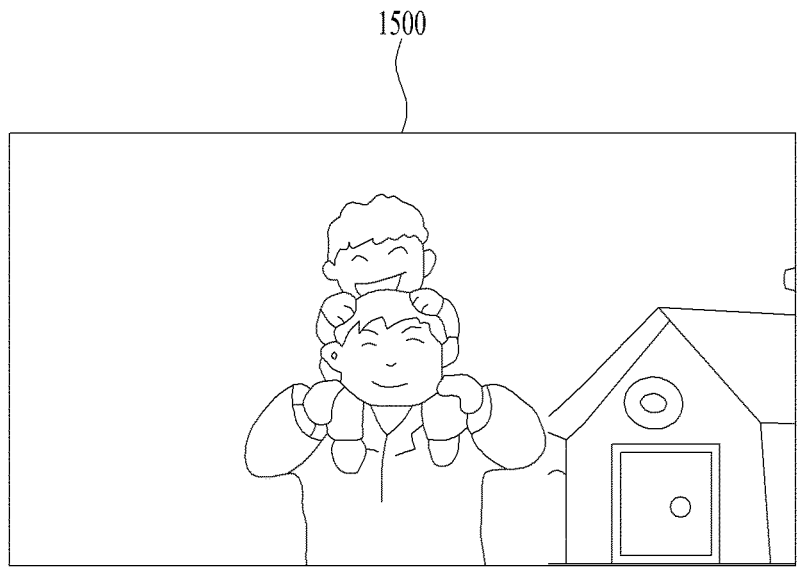
FIGS. 15 to 17 are diagrams showing images captured by a mobile terminal according to one embodiment of the present invention, respectively.
Figure 16:
Figure 17:

FIGS. 15 to 17 are diagrams showing images captured by a mobile terminal according to another embodiment of the present invention, respectively.

In case of receiving a touch input to the shot button 1430 (shown in FIG. 14) in a zoom-in state of a preview image, a process for the controller to obtain fourth to sixth images by controlling the first and second cameras is described as follows.

If receiving a signal for obtaining an image, the controller controls the first and second cameras, thereby obtaining a fourth image 1500 (FIG. 15) corresponding to a preview image zoomed in by the first camera, a fifth image 1600 (FIG. 16) corresponding to the object included in the zoomed-in preview image, and a sixth image 1700 (FIG. 17) corresponding to an object detected by the second camera. And, the controller saves the obtained images to the memory 370.

The controller 380 may save the obtained images to the memory 370 in a manner of distinguishing them as separate images.

Meanwhile, the controller 380 of the mobile terminal according to another embodiment of the present invention may be configured to create a single image group by image-processing the fourth to sixth images and save data included in the created image group to the memory 370.

Figure 18:
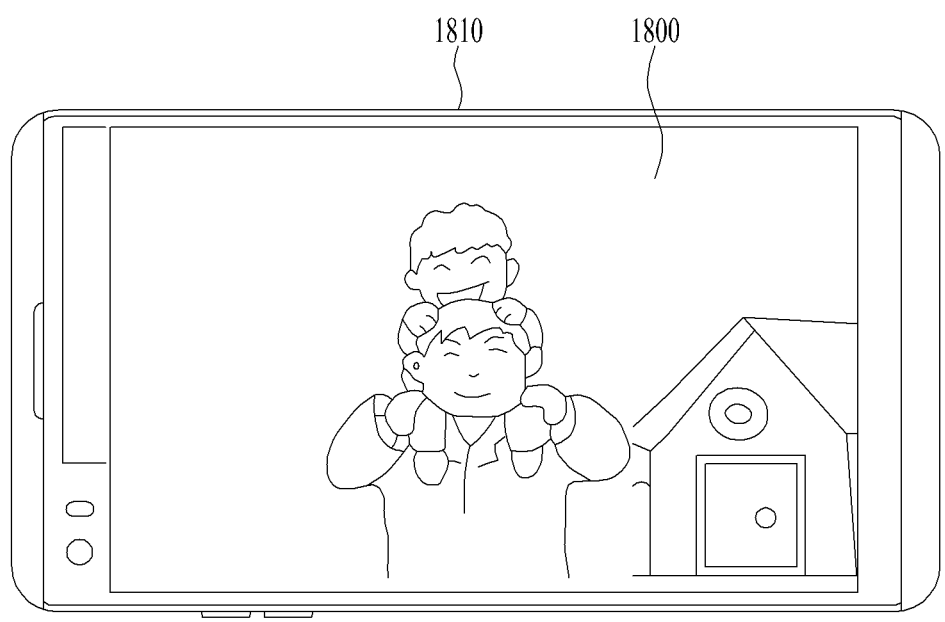
FIG. 18 and FIG. 19 are diagram showing captured images displayed on a mobile terminal according to one embodiment of the present invention, respectively.
Figure 19:
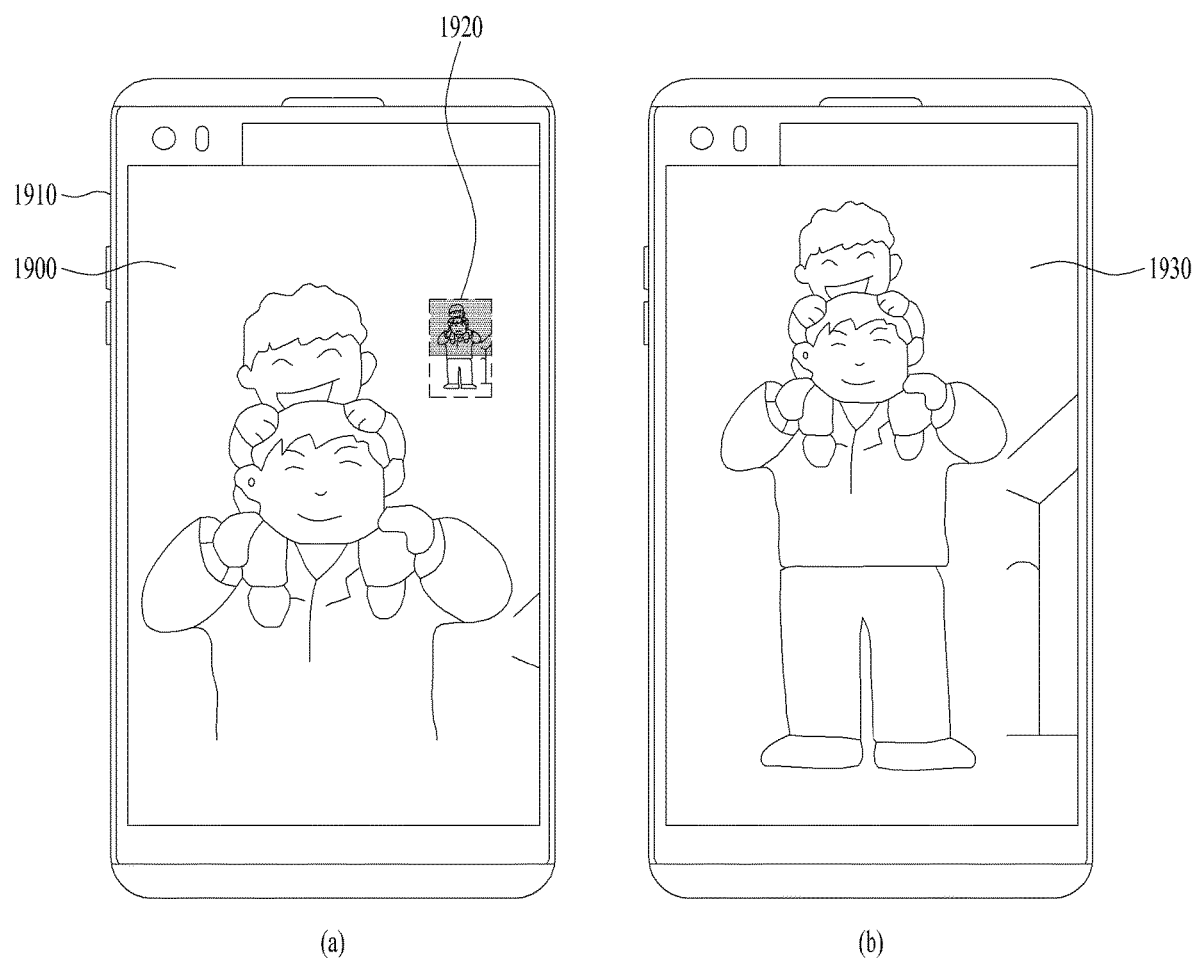

FIG. 18 and FIG. 19 are diagram showing captured images displayed on a mobile terminal according to one embodiment of the present invention, respectively.

Referring to FIG. 18, if the controller 380 detects a housing orientation 1810 as a first direction through the sensing unit 140, the controller controls a fourth image 1800, which corresponds to a preview image zoomed in by the first camera, to be displayed on the display unit 351. The first direction may correspond to a direction in which the housing orientation of the mobile terminal is landscape. If necessary, the controller can access the memory 370.

Referring to FIG. 19(a), if the controller 380 detects a housing orientation 1910 as a second direction through the sensing unit 140, the controller controls a fifth image 1900, which corresponds to the object included in the zoomed-in preview image, to be displayed on the display unit 351. The second direction may correspond to a direction in which the housing orientation of the mobile terminal is portrait. If necessary, the controller can access the memory 370.

In this case, a prescribed indicator described in FIG. 14 may be displayed on a prescribed region of the display unit together with the fifth image 1900.

FIG. 19(b) is a diagram showing that a sixth image 1930 corresponding to an object detected by the second camera is displayed.

First of all, the user input unit receives a zoom-out signal for the fifth image 1900. The zoom-out signal is a signal generated by a touch input to the indicator 1920 shown in FIG. 19(a) or a pinch touch to a prescribed region for example.

If receiving the zoom-out signal, the controller controls the display unit to display the sixth image 1930 corresponding to the object detected by the second camera instead of the fifth image 1900.

As terminologies used in the present specification are selected from general terminologies used currently and widely in consideration of functions in the present invention, they may be changed in accordance with intentions of technicians engaged in the corresponding fields, customs, advents of new technologies and the like. Therefore, terminologies used in the present specification need to be construed based on the substantial meanings of the corresponding terminologies and the overall matters disclosed in the present specification.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller of the wearable device. The foregoing embodiments are merely exemplary and are not to be considered as limiting the present disclosure. The present teachings can be readily applied to other types of methods and apparatuses. Thus, it is intended that the present invention covers the modifications and variations of this invention that come within the scope of the appended claims and their equivalents.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

MODE FOR INVENTION

Various embodiments are described in 'BEST MODE FOR INVENTION' for implementing the present invention.

Therefore, this description is intended to be illustrative, and not to limit the scope of the claims. Thus, it is intended that the present invention covers the modifications and variations of this invention provided they come within the scope of the appended claims and their equivalents.

INDUSTRIAL APPLICABILITY

As described above, the present invention is applicable to all mobile terminals entirely or in part.

What is claimed is:

1. A mobile terminal, comprising:
   a memory;
   a display;
   a first camera configured to obtain a first image corresponding to a preview image currently displayed on the display;
   a second camera configured to detect an object from the preview image obtained by the first camera and obtain a second image for the detected object;
   a sensor configured to sense a housing orientation of the mobile terminal; and
   a controller;
   wherein the controller:
   controls the second camera to obtain the second image together in response to a signal for the first camera to obtain the first image,
   controls the obtained first image by the first camera to be displayed on the display in response to sensing a first direction in which the housing orientation of the mobile terminal corresponds to landscape,
   controls the obtained second image by the second camera to be displayed on the display in response to sensing a second direction in which the housing orientation of the mobile terminal corresponds to portrait, wherein the first image includes the second image,
   wherein if receiving a zoom-in signal for the preview image before receiving the signal for obtaining the first image, displays an indicator on a prescribed region of the zoomed-in preview image and controls the indicator to display a rate occupied by the object included in a preview image after a zoom-in in a region of an object detected before the zoom-in by the second camera, and
   obtains a third image corresponding to the preview image after the zoom-in, a fourth image corresponding to the object included in the preview image after the zoom-in and a fifth image corresponding to the object detected by the second camera before the zoom-in, creates a single image group using the third to fifth images, and saves data included in the created image group to the memory.

2. The mobile terminal of claim 1, wherein if receiving a touch input signal for the display or an input signal for a physical button provided to the mobile terminal, the controller controls the first camera and the second camera to obtain the first image and the second image, respectively.

3. The mobile terminal of claim 1, wherein if a plurality of objects are detected by the second camera and a signal for selecting a specific object is received, the controller controls the second camera to obtain the second image centering on the selected specific object.

4. The mobile terminal of claim 1, wherein the controller sets the obtained first image as a basic image, creates a sixth image by encoding metadata of the second image to a header part of a raw image format of the first image, and saves the created sixth image to the memory.

5. The mobile terminal of claim 1, wherein a view angle of the first camera is different from that of the second camera.

6. The mobile terminal of claim 1, wherein if the housing orientation of the mobile terminal sensed through the sensor is the first direction, the controller controls the third image to be displayed on the display,
   wherein if the housing orientation of the mobile terminal sensed through the sensor is the second direction, the controller controls the fourth image to be displayed on the display, and
   wherein if receiving a zoom-out signal for the displayed fifth image, the controller displays the fifth image on the display instead of the fourth image.

7. A method of controlling a mobile terminal, the method comprising:
   obtaining a first image corresponding to a preview image currently displayed on a display through a first camera;
   detecting an object from the preview image obtained by the first camera by controlling a second camera in response to a signal for the first camera to obtain the first image and obtaining a second image for the detected object together;
   sensing a housing orientation of the mobile terminal;
   displaying the obtained first image by the first camera on the display in response to sensing a first direction in which the housing orientation of the mobile terminal corresponds to landscape;
   displaying the obtained second image by the second camera on the display in response to sensing a second direction in which the housing orientation of the mobile terminal corresponds to portrait, wherein the first image includes the second image;
   receiving a zoom-in signal for the preview image before receiving the signal for obtaining the first image;
   displaying an indicator on a prescribed region of the zoomed-in preview image in response to the zoom-in signal, wherein the indicator displays a rate occupied by the object included in a preview image after zoom-in in a region of an object detected before the zoom-in by the second camera;
   obtaining a third image corresponding to the preview image after the zoom-in, a fourth image corresponding to the object included in the preview image after the zoom-in and a fifth image corresponding to the object detected by the second camera before the zoom-in;
   creating a single image group using the third to fifth images; and
   saving data included in the created image group.

8. The method of claim 7, the obtaining the first image, further comprising receiving a touch input signal for a display of the mobile terminal or an input signal for a physical button provided to the mobile terminal.

9. The method of claim 7, the obtaining the second image, further comprising:
   if a plurality of objects are detected by the second camera, receiving a signal for selecting a specific object; and
   obtaining the second image centering on the selected specific object.

10. The method of claim 7, further comprising:
    setting the obtained first image as a basic image;
    creating a sixth image by encoding metadata of the second image to a header part of a raw image format of the first image; and
    saving the created sixth image.

11. The method of claim 7, wherein a view angle of the first camera is different from that of the second camera.

12. The method of claim 7, further comprising:
if the sensed housing orientation of the mobile terminal is the first direction, displaying the third image on the display of the mobile terminal;
if the sensed housing orientation of the mobile terminal is the second direction, displaying the fourth image on the display of the mobile terminal; and
if receiving a zoom-out signal for the displayed fifth image, displaying the fifth image on the display instead of the fourth image.

* * * * *